US012416387B1

(12) United States Patent
Howard et al.

(10) Patent No.: US 12,416,387 B1
(45) Date of Patent: Sep. 16, 2025

(54) FLEXIBLE NEON LED NIGHTLIGHT

(71) Applicant: Mary Elle Fashions, Inc., St. Louis, MO (US)

(72) Inventors: Kenneth A. Howard, Creve Coeur, MO (US); Matthew S. Smith, St. Charles, MO (US)

(73) Assignee: Mary Elle Fashions, Inc., St. Louis, MO (US)

( * ) Notice: Subject to any disclaimer, the term of this patent is extended or adjusted under 35 U.S.C. 154(b) by 0 days.

(21) Appl. No.: 18/779,267

(22) Filed: Jul. 22, 2024

Related U.S. Application Data

(60) Provisional application No. 63/661,301, filed on Jun. 18, 2024, provisional application No. 63/562,877, filed on Mar. 8, 2024.

(51) Int. Cl.
*F21S 4/26* (2016.01)
*F21V 23/04* (2006.01)
(Continued)

(52) U.S. Cl.
CPC ............ *F21S 4/26* (2016.01); *F21V 23/0435* (2013.01); *F21Y 2103/10* (2016.08); *F21Y 2113/00* (2013.01); *F21Y 2115/10* (2016.08)

(58) Field of Classification Search
CPC F21S 4/26; F21S 4/22; F21V 23/0435; F21Y 2103/10; F21Y 2115/10; F21Y 2113/00; F21Y 2103/37
See application file for complete search history.

(56) References Cited

U.S. PATENT DOCUMENTS 10,655,804 B1 * 5/2020 Yuan .......................... F21S 4/22
2007/0109782 A1 * 5/2007 Wolf ....................... A61L 9/037
362/253

(Continued)

*Primary Examiner* — Bao Q Truong
(74) *Attorney, Agent, or Firm* — Lewis Rice LLC

(57) ABSTRACT

A nightlight including a base and an electrical prong secured to the base and adapted to be inserted into an electrical outlet is disclosed. A main circuit is coupled to the electrical prong and contained within the base. A flexible neon LED strip is coupled to the main circuit for receiving an electrical current. A support frame is configured in the shape of an image wherein the support frame has an arcuate shaped cross-section or a C-shaped cross-section sized to receive the flexible neon LED strip. The flexible neon LED strip is positioned along the support frame whereby the flexible neon LED strip when energized emits light corresponding to the image and illuminates an area adjacent the night light. A sound transducer may produce an electrical signal as a function of an ambient sound. The flexible neon LED strip may comprise an RGB LED, an RGB IC, or a solid color LED to produce different colors of light. The main circuit may vary the color of the emitted light that is produced by the flexible neon LED strip as a function of a switch, a remote control, or the ambient sound. The support frame may comprise a back wall and a plurality of side walls where the back wall is translucent or transparent and where the flexible neon LED strip may emit light out of a front surface and a back surface of the flexible neon LED strip. Alternatively, the support frame may comprise an arcuate cross-section where the back wall is translucent or transparent and where the flexible neon LED strip is cylindrical and may emit light out of a front surface and a back surface or all surfaces of the flexible neon LED strip.

22 Claims, 2 Drawing Sheets

(51) Int. Cl.

| | |
|---|---|
| *F21Y 103/10* | (2016.01) |
| *F21Y 113/00* | (2016.01) |
| *F21Y 115/10* | (2016.01) |

(56) References Cited

U.S. PATENT DOCUMENTS

2011/0163683 A1* 7/2011 Steele .................... F21V 23/06
315/192
2014/0028210 A1* 1/2014 Maxik .................... F21S 9/024
362/640
2015/0159843 A1* 6/2015 Chien .................... F21V 17/02
362/190

* cited by examiner

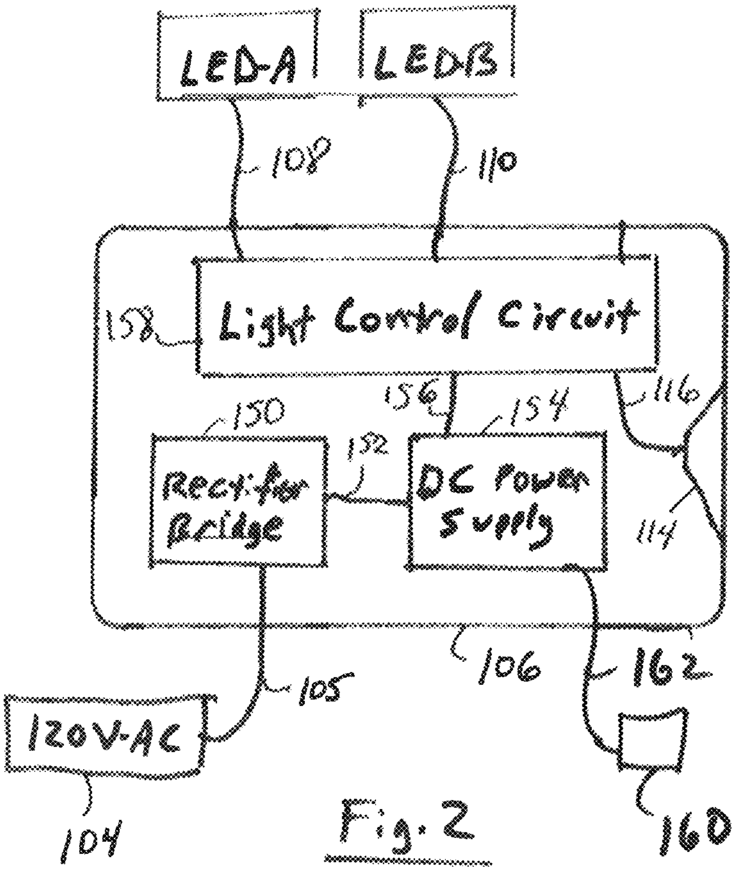
Fig. 2
Fig. 3
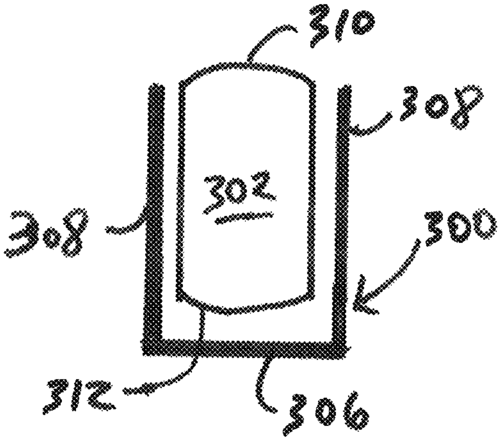
Fig. 4
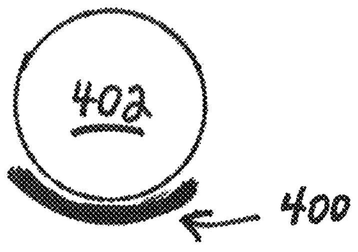

FLEXIBLE NEON LED NIGHTLIGHT

CROSS REFERENCE TO RELATED APPLICATIONS

This application claims the benefit of U.S. Provisional Application Nos. 63/661,301, filed Jun. 18, 2024, and 63/562,877, filed Mar. 8, 2024. The entire disclosure of all of the above documents is herein incorporated by reference.

FIELD OF THE INVENTION

The present disclosure relates to a nightlight for illuminating an area adjacent thereto using an illuminated image formed from a flexible neon LED positioned in a C-channel and configured in the shape of the image.

BACKGROUND OF THE INVENTION

Traditional nightlights have used low power incandescent bulbs or LEDs to provide a low level of typically yellow or white light adjacent thereto. Some nightlights have incorporated images or cut-outs to display a pattern on an adjacent wall. Other nightlights have incorporated colored lights to display or illuminate with various selected colors. Nightlights may be activated with a manual switch or a light sensitive switch that is activated when the ambient light level falls below a preset level.

SUMMARY

As described more fully below, embodiments may include a nightlight with a base and an electrical prong secured to the base and adapted to be inserted into an electrical outlet. A main circuit may be coupled to the electrical prong and contained within the base. A flexible neon LED strip may be coupled to the main circuit for receiving an electrical current. A support frame may be configured in the shape of an image wherein the support frame has a C-shaped cross-section or an arcuate cross-section sized to receive the flexible neon LED strip. The flexible neon LED strip may be positioned along the support frame whereby the flexible neon LED strip when energized emits light corresponding to the image and illuminates an area adjacent the night light. A sound transducer may produce an electrical signal as a function of an ambient sound. The flexible neon LED strip may comprise an RGB LED, an RGB integrated circuit ("IC"), or a solid color LED to produce different colors of light. The main circuit may vary the color of the emitted light that is produced by the flexible neon LED strip as a function of a switch, a remote control, or the ambient sound. The support frame may comprise a back wall and a plurality of side walls where the back wall is translucent or transparent and where the flexible neon LED strip may emit light out of a front surface and a back surface or all surfaces of the flexible neon LED strip. The support frame may comprise an arcuate cross-section where the back wall is translucent or transparent and where the flexible neon LED strip is cylindrical and may emit light out of a front surface and a back surface or all surfaces of the flexible neon LED strip.

In one embodiment, a nightlight includes a base and an electrical prong adapted to be inserted into an electrical outlet, wherein the electrical prong is secured to and projects from the base. A main circuit is coupled to the electrical prong and contained within the base. A flexible neon LED strip is coupled to the main circuit for receiving an electrical current from the main circuit. A support frame is configured in the shape of an image and the support frame has a C-shaped cross-section or an arcuate cross-section sized to receive the flexible neon LED strip. The flexible neon LED strip is positioned along the support frame and, when energized by the main circuit, the flexible neon LED strip emits light corresponding to the image and illuminates an area adjacent the night light. Alternatively, the support frame may comprise an arcuate cross-section where the back wall is translucent or transparent and where the flexible neon LED strip is cylindrical and may emit light out of a front surface and a back surface or all surfaces of the flexible neon LED strip.

The night light may comprise a sound transducer to produce an electrical signal as a function of an ambient sound. The flexible neon LED strip may comprise an RGB LED, an RGB IC, or a solid color LED to produce different colors of light. The main circuit may be coupled to the sound transducer and the flexible neon LED strip for varying the color of the emitted light that is produced by the flexible neon LED strip as a function of a switch, a remote control, or the ambient sound. The support frame may comprise a back wall and a plurality of side walls, where the back wall is translucent and the flexible neon LED strip emits light out of a front surface and a back surface of the flexible neon LED strip. Alternatively, the back wall of the support frame may be transparent. The main circuit may be adapted to vary the color of the emitted light and the intensity of the emitted light that is produced by the flexible neon LED strip as a function of the switch, the remote control, or the ambient sound.

The night light may comprise a plurality of flexible neon LED strips that are electrically coupled to each other and where the plurality of flexible neon LED strips emit light at the same time. The night light may comprise a plurality of flexible neon LED strips that are electrically coupled to the main circuit and where the plurality of flexible neon LED strips are controlled by the main circuit to emit light independently of each other. The night light may comprise a plurality of flexible neon LED strips that are electrically coupled to the main circuit and where the plurality of flexible neon LED strips are controlled by the main circuit to emit light independently of each other as a function of a switch, a remote control, or an ambient sound.

Other features will be in part apparent and in part pointed out hereinafter.

BRIEF DESCRIPTION OF THE DRAWINGS

FIG. 2 shows a schematic diagram of circuitry to control a light source.

FIG. 3 shows a cross-section through a channel shaped support for securing a flexible neon LED.

FIG. 4 shows a cross-section through an arcuate support for securing a flexible neon LED.

Corresponding reference characters indicate corresponding parts throughout the drawings.

DETAILED DESCRIPTION

Figure 1:
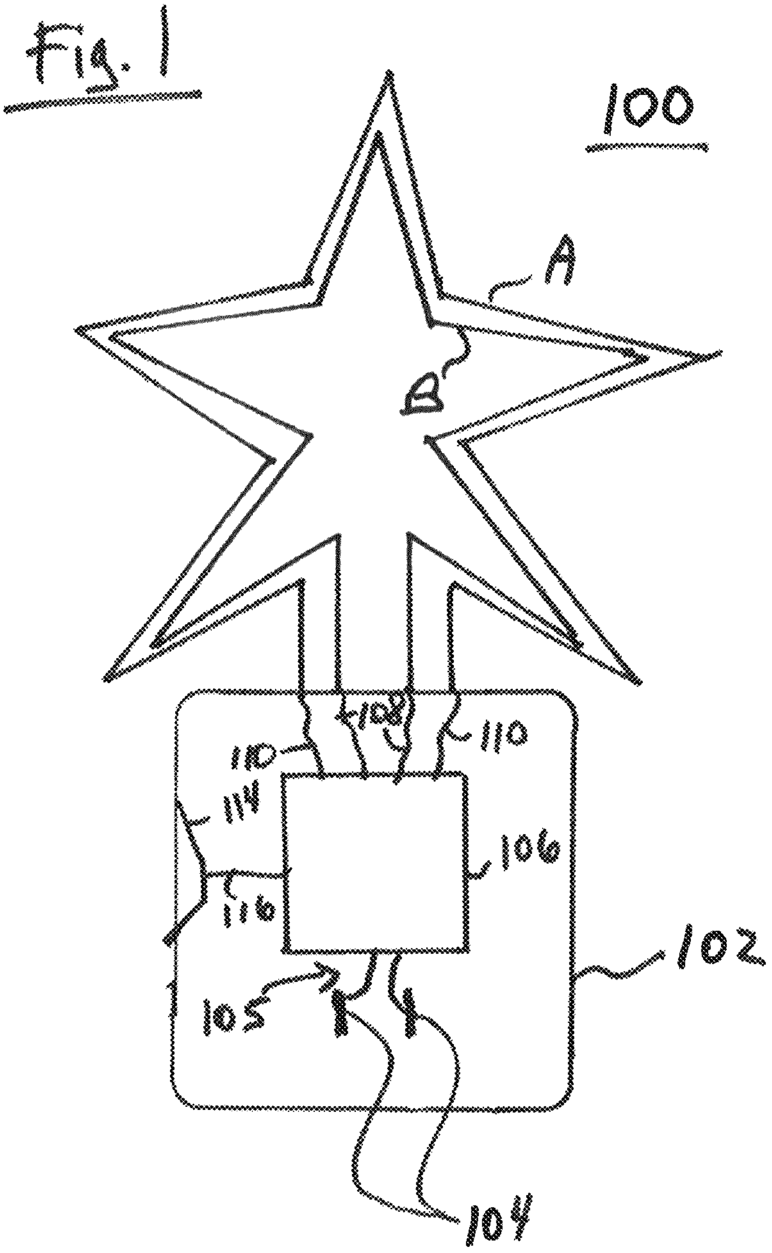
FIG. 1 shows a nightlight comprising a flexible neon LED.

FIG. 1 shows a nightlight 100 that includes a plurality of colorful light sources, such as Flexible neon LEDs A and B, formed into a preferred image such as the star shown there. LEDs A and B may be any color of LED or a preferred mix of red, green and blue LEDs. LEDs A and B may be sized and structured to provide any preferred color and intensity of light. For example, as is known in the art, multiple LEDs may be located adjacent each other to provide light mixing to thereby provide many of the colors in the visible spectrum. The LEDs may comprise an RGB LED, an RGB IC, or a solid color LED. More than two LEDs for each formed image in FIG. 1 may be used within the scope of the invention depending on the preferences of the designer and the size of the desired image. For example, nightlight 100 may include at least 5 LEDs, at least 10 LEDs, or at least 50 LEDs but likely not more than 1,000 LEDs or not more than 500 LEDs or not more than 100 LEDs.

Nightlight 100 includes a base 102 that supports conventional electrical prongs 104 sized for insertion into a standard electrical outlet that provides nominal 120 volt AC electricity. A conductor 105 provides the electrical power to a main circuit 106. The main circuit 106 includes conductors 108 and 110 for selectively energizing LEDs A and B. Nightlight 100 also includes a sound transducer or microphone 114 that creates an electrical signal in response to ambient sound. This electrical signal is provided to main circuit 106 via conductor 116.

In use, the main circuit 106 may receive a signal from sound transducer 114 and, in response thereto, vary the electricity provided to LEDs A and B to vary the color of the light output by the nightlight 100 as a function of a switch, a remote control, or the ambient sound. In use, the main circuit 106 may receive a signal from sound transducer 114 and, in response thereto, vary the electricity provided to LEDs A and B to vary the intensity of the light or the intensity of the color of the light output by the nightlight 100 as a function of a switch, a remote control, or the ambient sound. In use, the main circuit 106 may receive a signal from sound transducer 114 and, in response thereto, vary the electricity provided to LEDs A and B to vary the color and intensity of the light output by the nightlight 100 as a function of a switch, a remote control, or the ambient sound.

FIG. 2 is a schematic diagram for the main circuit 106. As seen, main circuit 106 is connected to conventional electrical prongs 104 sized for insertion into a standard electrical outlet that provides nominal 120 volt AC electricity. A rectifier bridge 150 provides a DC voltage. The rectifier bridge 150 may be a full bridge or a partial bridge, as known to those skilled in the art. The DC voltage is carried by a conductor 152 to a DC power supply 154 that supplies a light control circuit 158 with an appropriate level of DC voltage. DC power supply may preferably include a capacitor (not shown) to smooth out the DC wave form. The light control circuit 158 is connected to the sound transducer or microphone 114 via conductor 116. The light control circuit 158 controls LEDs A and B, respectively, via conductors 108 and 110.

In use, the light control circuit 158 may receive a signal from sound transducer 114 and, in response thereto, vary the electricity provided to LEDs A and B to vary the color of the light output by the nightlight 100 as a function of a switch, a remote control, or the ambient sound. In use, the light control circuit 158 may receive a signal from sound transducer 114 and, in response thereto, vary the electricity provided to LEDs A and B to vary the intensity of the light or the intensity of the color of the light output by the nightlight 100 as a function of the switch, the remote control, or the ambient sound. In use, the light control circuit 158 may receive a signal from sound transducer 114 and, in response thereto, vary the electricity provided to LEDs A and B to vary the color and intensity of the light output by the nightlight 100 as a function of the switch, the remote control, or the ambient sound.

LEDs A and B in FIG. 2 may be red, green and blue LEDs, respectively, or may be sized and structured to provide any preferred color and intensity of light. For example, as is known in the art, multiple LEDs may be located adjacent each other to provide light mixing to thereby provide many of the colors in the visible spectrum. The LEDs may comprise an RGB LED, an RGB IC, or a solid color LED. Many more than two LEDs may be used within the scope of the invention depending on the preferences of the designer. For example, each of the images formed from the flexible neon LED nightlight 100 may contain at least 5 LEDs, at least 10 LEDs, or at least 50 LEDs but likely not more than 1,000 LEDs or not more than 500 LEDs or not more than 100 LEDs.

FIG. 3 shows a cross-section through a support frame 300 configured in the shape of an image, such as the star-shaped image shown in FIG. 1. The support frame 300 preferably has a C-shaped cross-section sized to receive a flexible neon LED strip 302. The flexible neon LED strip 302 is positioned along the support frame 300 to illuminate the shape of the image such as the star-shaped image in FIG. 1 and to illuminate an area adjacent to the night light 100. When it is necessary to bend the flexible neon LED strip 302 through sharper angles such as the point on the star image shown in FIG. 1, then the diameter of the flexible neon LED strip 302 preferably has a smaller diameter or thickness such as 8 mm, 7 mm, 6 mm, 5 mm or even 4 mm. It may also be preferable to form the flexible neon LED strip 302 with flat side walls and round ends so that the flexible neon LED strip 302 may be bent through its flat sides when forming an image. As seen, the support frame has a back wall 306 and a plurality of sidewalls 308. The back wall 306 may be translucent and the flexible neon LED strip 302 may emit light out of a front surface 310 and a back surface 312 of the flexible neon LED strip 302. The back wall 306 may be transparent and the flexible neon LED strip 302 may emit light out of a front surface 310 and a back surface 312 of the flexible neon LED strip 302. Alternatively, the entire support frame 300 may be transparent and the flexible neon LED strip 302 may emit light out through the entirety of its external surface including the surface attached to support frame 300. In this way, light emanating from the flexible neon LED strip 302 may be emitted through the support frame 300 to provide overall greater illumination and to provide an additional aspect in the design of the image, such as the star in FIG. 1.

Nightlight 100 can be made using multiple flexible neon LED strips 302 that are electrically coupled to each other for emitting light at the same time, at different times or at independent times. Nightlight 100 can be made using multiple flexible neon LED strips 302 that are electrically coupled to each other for emitting light at the same time, at different times or at independent times all as a function of a switch, a remote control, or the ambient sound and the signal from sound transducer 114.

FIG. 4 shows a cross-section through a support frame 400 configured in the shape of an image, such as the star-shaped image shown in FIG. 1. The support frame 400 preferably has an arcuate cross-section sized to receive a flexible neon LED strip 402. In this embodiment, the flexible neon LED strip 402 preferably has a round cross-section and an overall shape that is substantially cylindrical. The flexible neon LED strip 402 is positioned along the support frame 400 to illuminate the shape of the image such as the star-shaped image in FIG. 1 and to illuminate an area adjacent to the night light 100. When it is necessary to bend the flexible neon LED strip 402 through sharper angles such as the point on the star image shown in FIG. 1, then the diameter of the flexible neon LED strip 402 preferably has a smaller diameter or thickness such as 8 mm, 7 mm, 6 mm, 5 mm or even 4 mm. For images that do not require such sharp angles, the flexible neon LED strip 402 may have a larger diameter or thickness such as 9 mm, 10 mm, 11 mm, 12 mm, 13 mm, 14 mm, or even 15 mm. The diameter of the flexible neon LED strip 402 preferably falls within the range from 4 mm to 15 mm, from 6 mm to 13 mm, or from 8 mm to 13 mm. It may also be preferable to form the flexible neon LED strip 402 with a flat side wall for attachment to a support frame such as support frame 300 or 400. The support frame 400 may be translucent and the flexible neon LED strip 402 may have a relatively opaque region for attachment to the support frame. Alternatively, the support frame 400 may be transparent and the flexible neon LED strip 402 may emit light out through the entirety of its external surface including the surface attached to support frame 400. In this way, light emanating from the flexible neon LED strip 402 may be emitted through the support frame 400 to provide overall greater illumination and to provide an additional aspect in the design of the image, such as the star in FIG. 1.

Nightlight 100 can be made using multiple flexible neon LED strips 402 that are electrically coupled to each other for emitting light at the same time, at different times or at independent times. Nightlight 100 can be made using multiple flexible neon LED strips 402 that are electrically coupled to each other for emitting light at the same time, at different times or at independent times all as a function of a switch, a remote control, or the ambient sound and the signal from sound transducer 114.

Having described the invention in detail, it will be apparent that modifications and variations are possible without departing from the scope of the invention defined in the appended claims.

When introducing elements of the present invention or the preferred embodiments thereof, the articles “a”, “an”, “the” and “said” are intended to mean that there are one or more of the elements. The terms “comprising”, “including” and “having” are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What we claim is:

1. A nightlight comprising:

a base;

an electrical prong adapted to be inserted into an electrical outlet, wherein the electrical prong is secured to and projects from the base;

a main circuit coupled to the electrical prong and contained within the base;

a flexible neon LED strip coupled to the main circuit for receiving an electrical current from the main circuit;

a support frame configured in the shape of an outline of an image;

wherein the support frame has a C-shaped cross-section or an arcuate cross-section sized to receive the flexible neon LED strip;

wherein the flexible neon LED strip is positioned along the support frame in the shape of the outline of the image;

whereby the flexible neon LED strip when energized by the main circuit emits light to illuminate the shape of the outline of the image and illuminates an area adjacent the night light.

2. The nightlight of claim 1 further comprising:

a sound transducer for producing an electrical signal as a function of an ambient sound; and wherein the flexible neon LED strip includes an RGB LED, an RGB IC, or a solid color LED to produce different colors of light; and wherein the main circuit is coupled to the sound transducer and the flexible neon LED strip for varying the color of the emitted light that is produced by the flexible neon LED strip as a function of a switch, a remote control, or the ambient sound.

3. The nightlight of claim 1 wherein the support frame further comprises a back wall and a plurality of side walls; wherein the back wall is translucent; and wherein the flexible neon LED strip emits light out of a front surface and a back surface of the flexible neon LED strip.

4. The nightlight of claim 1 wherein the support frame further comprises a back wall and a plurality of side walls; wherein the back wall is transparent; and wherein the flexible neon LED strip emits light out of a front surface and a back surface of the flexible neon LED strip.

5. The nightlight of claim 1 wherein the support frame further comprises a back wall and a plurality of side walls; wherein the support frame is transparent; and wherein the flexible neon LED strip emits light out of the entirety of an external surface of the flexible neon LED strip.

6. The nightlight of claim 1 wherein the main circuit is adapted to vary the color of the emitted light and an intensity of the emitted light that is produced by the flexible neon LED strip as a function of a switch, a remote control, or the ambient sound.

7. The nightlight of claim 1 wherein the flexible neon LED strip comprises a plurality of flexible neon LED strips that are electrically coupled to each other; and wherein the plurality of flexible neon LED strips emit light at the same time.

8. The nightlight of claim 1 wherein the flexible neon LED strip comprises a plurality of flexible neon LED strips that are electrically coupled to the main circuit; and wherein the plurality of flexible neon LED strips are controlled by the main circuit to emit light independently of each other.

9. The nightlight of claim 1 wherein the flexible neon LED strip comprises a plurality of flexible neon LED strips that are electrically coupled to the main circuit; and wherein the plurality of flexible neon LED strips are controlled by the main circuit to emit light independently of each other as a function of a switch, a remote control, or the ambient sound.

10. The nightlight of claim 1 wherein the support frame further comprises an arcuate shape; wherein the support frame is translucent; and wherein the flexible neon LED strip emits light out of a front surface of the flexible neon LED strip and does not emit light out of a surface that is attached to the support frame.

11. The nightlight of claim 1 wherein the support frame further comprises an arcuate shape; wherein the flexible neon LED strip comprises a cylindrical shape; wherein the support frame is transparent; and wherein the flexible neon LED strip may emit light out through the entirety of an external surface including the surface attached to the support frame.

12. The nightlight of claim 1 wherein the support frame further comprises an arcuate shape; wherein the flexible neon LED strip comprises a cylindrical shape; wherein the support frame is translucent; and wherein the flexible neon LED strip may emit light out through the entirety of an external surface including the surface attached to the support frame.

13. The nightlight of claim 2 wherein the support frame further comprises a back wall and a plurality of side walls; wherein the back wall is translucent; and wherein the flexible neon LED strip emits light out of a front surface and a back surface of the flexible neon LED strip.

14. The nightlight of claim 2 wherein the support frame further comprises a back wall and a plurality of side walls; wherein the back wall is transparent; and wherein the flexible neon LED strip emits light out of a front surface and a back surface of the flexible neon LED strip.

15. The nightlight of claim 2 wherein the support frame further comprises a back wall and a plurality of side walls; wherein the support frame is transparent; and wherein the flexible neon LED strip emits light out of the entirety of an external surface of the flexible neon LED strip.

16. The nightlight of claim 2 wherein the main circuit is adapted to vary the color of the emitted light and an intensity of the emitted light that is produced by the flexible neon LED strip as a function of a switch, a remote control, or the ambient sound.

17. The nightlight of claim 2 wherein the flexible neon LED strip comprises a plurality of flexible neon LED strips that are electrically coupled to each other; and wherein the plurality of flexible neon LED strips emit light at the same time.

18. The nightlight of claim 2 wherein the flexible neon LED strip comprises a plurality of flexible neon LED strips that are electrically coupled to the main circuit; and wherein the plurality of flexible neon LED strips are controlled by the main circuit to emit light independently of each other.

19. The nightlight of claim 2 wherein the flexible neon LED strip comprises a plurality of flexible neon LED strips that are electrically coupled to the main circuit; and wherein the plurality of flexible neon LED strips are controlled by the main circuit to emit light independently of each other as a function of a switch, a remote control, or the ambient sound.

20. The nightlight of claim 2 wherein the support frame further comprises an arcuate shape; wherein the support frame is translucent; and wherein the flexible neon LED strip emits light out of a front surface of the flexible neon LED strip and does not emit light out of a surface that is attached to the support frame.

21. The nightlight of claim 2 wherein the support frame further comprises an arcuate shape; wherein the flexible neon LED strip comprises a cylindrical shape; wherein the support frame is transparent; and wherein the flexible neon LED strip may emit light out through the entirety of an external surface including the surface attached to the support frame.

22. The nightlight of claim 2 wherein the support frame further comprises an arcuate shape; wherein the flexible neon LED strip comprises a cylindrical shape; wherein the support frame is translucent; and wherein the flexible neon LED strip may emit light out through the entirety of an external surface including the surface attached to the support frame.

* * * * *